US008815984B2

(12) United States Patent
Nasreddine et al.

(10) Patent No.: US 8,815,984 B2
(45) Date of Patent: Aug. 26, 2014

(54) ELASTOMERIC COMPOSITIONS WITH IMPROVED HEAT RESISTANCE, COMPRESSION SET, AND PROCESSABILITY

(75) Inventors: Victor Nasreddine, Cranberry Township, PA (US); Sharon Guo, London (CA)

(73) Assignee: LANXESS Inc., London, Ontario (CA)

( * ) Notice: Subject to any disclaimer, the term of this patent is extended or adjusted under 35 U.S.C. 154(b) by 158 days.

(21) Appl. No.: 13/062,760

(22) PCT Filed: Sep. 11, 2009

(86) PCT No.: PCT/US2009/056636
§ 371 (c)(1),
(2), (4) Date: Jun. 30, 2011

(87) PCT Pub. No.: WO2010/030860
PCT Pub. Date: Mar. 18, 2010

(65) Prior Publication Data
US 2011/0251320 A1 Oct. 13, 2011

Related U.S. Application Data

(60) Provisional application No. 61/096,436, filed on Sep. 12, 2008.

(51) Int. Cl.
C08K 3/34 (2006.01)
(52) U.S. Cl.
USPC .......................................... 523/212; 524/456
(58) Field of Classification Search
USPC .......................................... 523/212; 524/456
See application file for complete search history.

(56) References Cited

U.S. PATENT DOCUMENTS

| 4,983,678 | A | 1/1991 | Saito et al. | |
|---|---|---|---|---|
| 5,208,294 | A | 5/1993 | Brown | |
| 5,391,627 | A | 2/1995 | Araki et al. | |
| 6,451,902 | B2 * | 9/2002 | Campomizzi | 524/511 |
| 6,492,454 | B1 | 12/2002 | Ozawa et al. | |
| 6,780,939 | B2 | 8/2004 | Guerin et al. | |
| 6,841,623 | B2 | 1/2005 | Guerin et al. | |
| 6,946,526 | B2 | 9/2005 | Guerin et al. | |
| 7,005,467 | B2 | 2/2006 | Campomizzi et al. | |
| 7,094,825 | B2 | 8/2006 | Yamanaka | |
| 7,264,249 | B2 | 9/2007 | Yokoyama et al. | |
| 7,381,781 | B2 | 6/2008 | Ong et al. | |
| 7,449,523 | B2 | 11/2008 | Park | |
| 7,659,339 | B2 | 2/2010 | Nasreddine et al. | |
| 2001/0000343 | A1 * | 4/2001 | Bowers | 526/255 |
| 2003/0188793 | A1 | 10/2003 | Kanbe et al. | |
| 2004/0092634 | A1 | 5/2004 | Arnoldi et al. | |
| 2004/0097605 | A1 * | 5/2004 | Kurisu et al. | 521/50.5 |
| 2005/0143522 | A1 | 6/2005 | Guerin et al. | |
| 2005/0159557 | A1 * | 7/2005 | Fukushi et al. | 525/326.3 |
| 2006/0142467 | A1 * | 6/2006 | Park | 524/495 |
| 2007/0299200 | A1 | 12/2007 | Kobayashi et al. | |
| 2008/0214758 | A1 * | 9/2008 | Guerin | 526/171 |
| 2009/0186977 | A1 | 7/2009 | Nagamori et al. | |
| 2009/0234054 | A1 * | 9/2009 | Nagamori et al. | 524/263 |

FOREIGN PATENT DOCUMENTS

| CA | 2558900 | A1 | 3/2007 |
|---|---|---|---|
| EP | 1591481 | A1 | 2/2005 |
| EP | 1707350 | A2 | 10/2006 |
| EP | 1743918 | A1 | 1/2007 |
| EP | 1808458 | A1 | 7/2007 |
| JP | 2008179671 | A2 | 8/2008 |
| JP | 2009001739 | A2 | 1/2009 |
| RU | 2318842 | C1 | 3/2008 |
| WO | 03/064513 | | 8/2003 |
| WO | 2004/035669 | | 4/2004 |
| WO | 2008/001692 | * | 1/2008 |

OTHER PUBLICATIONS

Pazur, R.J. (Dec. 1, 2006). Enhancing compound properties and aging resistance by using low viscosity HNBR, Rubber World, ISSN: 0035-9572, 9 pages, The Free Library. (2006).
International Search Report from co-pending Application PCT/US2009/056636 dated Dec. 30, 2009, 2 pages.
Encyclopedia of Polymer Science and Engineering, vol. 4, pp. 66 et seq. "Compounding".
Encyclopedia of Polymer Science and Engineering, vol. 17, pp. 666 et seq. "Vulcanization".
Nasreddine et al.: Rubber World, ISSN: 0035-9572,Feb. 1, 2008, "Low Mooney viscosity HNBR polymers with high acrylonitrile content".
Nasreddine et al.: "HNBR Fulfilling requirements of auto an heavy duty vehicle applications" pp. 31-38.

* cited by examiner

Primary Examiner — Margaret Moore
(74) Attorney, Agent, or Firm — Jennifer R. Seng

(57) ABSTRACT

An elastomeric composition containing a rubber polymer, an acid acceptor, and a silane-modified needle-like/acircular mineral additive. Compositions according to the present invention have superior heat resistance, compression set resistance, and improved processability (lower compound Mooney) compared to known rubber compositions.

16 Claims, No Drawings

ELASTOMERIC COMPOSITIONS WITH IMPROVED HEAT RESISTANCE, COMPRESSION SET, AND PROCESSABILITY

FIELD OF THE INVENTION

An elastomeric composition containing a rubber polymer, an acid acceptor, and a silane-modified mineral additive. Compositions according to the present invention have superior heat resistance, compression set resistance, and improved processability (lower compound Mooney) compared to known hydrogenated nitrile rubber containing compositions.

BACKGROUND OF THE INVENTION

There is an increased demand for elastomeric compositions having improved heat and fluid resistance in automotive and industrial applications. In automotive applications, the new sophisticated design and engineering of engine compartments and under-the-hood parts requires the use of elastomers that can withstand higher service temperatures and long term aging. Similarly, industrial applications are following a similar trend where elastomers are expected to have high performance and function in harsh conditions.

The heat resistance of an elastomer is defined as the maximum temperature at which a given elastomer is capable of operating for an extended period of time, while still retaining its properties. The physical and chemical properties of elastomers exposed to heat and/or air can change and that change can include: (a) additional crosslinking resulting in higher crosslink density and embrittlement of elastomers, (b) chain scission leading to a reduction in chain length and average molecular weight, leading to softening of the material; and (c) chemical alternation of the polymer chain by the formation of polar or other groups.

At elevated temperatures, molecules absorb heat energy leading to covalent bond cleavage and material degradation. Unsaturation in the polymer chains will make the materials more susceptible to heat because the energy required to break the second bond of C═C to form active radicals is relatively low. This behavior is clearly evident by the low thermal degradation temperatures of butyl rubber, nitrile rubbers and styrene-butadiene rubbers.

When nitrile (NBR) is hydrogenated to HNBR using a metal catalyst at designated temperatures and pressures, a new polymer is formed that has excellent heat and oil resistance and its properties can be controlled by varying the acrylonitrile level, residual double bonds, and molecular weight. Hydrogenated nitrile elastomers have excellent chemical, oil, and solvent resistance, as well as good aging and heat resistance. HNBR is an improvement over the limitations of NBR, in terms of degradation when exposed to high underhood temperatures in automotive fuel-line components. It also has reduced problems associated with cracking and reduced physical properties. Increasing hydrogenation levels give higher heat and ozone resistance. HNBR is widely used in the automotive market. Examples are belts, hoses, static and dynamic seals. Other areas of application include seals for oil field exploration and processing, and rolls for steel and paper mills.

In addition to the basic polymer chain structure, the vulcanization system also plays a role in the thermal stability. Elastomers vulcanized with peroxides, which form C—C crosslinks, have higher heat resistance as compared to sulfur cured elastomers. This is because the bond energy of C—C is much higher than C—S and polysulfide bonds. Also, heat resistance of sulfur cured elastomers is affected by the length of the sulfur crosslinks. Because of the much weaker polysulfide bonds, vulcanizates with long sulfur crosslinks are more vulnerable to deterioration under heat and oxygen. However, peroxide crosslinking requires special attention to the selection of compounding ingredients. Materials such as plasticizers, oils, and acidic materials can decrease the crosslinking efficiency by competing with the polymer for the free radicals produced by peroxides.

There are many methods of improving the heat resistance of HNBR compounds using antioxidants that have minimal interference with peroxide curing, high pH fillers and additives, as well as acid acceptors. Other methods include the use of synergistic stabilizer systems composed of metal salt of a secondary amine as disclosed in U.S. Pat. Nos. 6,947,526; 6,451,902; 7,005,467; U.S. Patent Publ. No. 2004/092634; U.S. Patent Publ. No. 2005/0143522.

The present invention provides a novel elastomeric composition containing an acid acceptor, and a silane-modified mineral additive. Compositions according to the present invention have superior heat resistance at 150° C. and higher temperatures, compression set resistance, and improved processability as evidenced by a lower compound Mooney, shows excellent heat and compression set resistance after long term aging. The inventive composition also has improved processability.

SUMMARY OF THE INVENTION

The combination of an acid acceptor, and a silane-modified mineral additive, and optionally a stabilizer system, results in a synergy leading to the inventive compound that has superior heat resistance, lower compression set, and lower compound Mooney. This inventive compound is superior to the compound containing the stabilizer system only. It is also superior to the compound containing the stabilizer and a basic mineral additive known in the art to improve aging.

DETAILED DESCRIPTION OF THE INVENTION

The present invention provides elastomeric composition containing a rubber polymer, a silane modified mineral additive and an acid acceptor. The present invention can also include the use of a stabilizing system. According to the present invention, the rubber polymer is preferably selected from the group consisting of a nitrile rubber or a carboxylated rubber.

As used throughout this specification, the term "carboxylated rubber" is intended to have a broad meaning and is meant to encompass a rubber having carboxylic groups. Suitable rubbers include XSBR (Styrene-butadiene copolymers and graft polymers with other unsaturated polar monomers such as acrylic acid, methacrylic acid, acrylamide, methacrylamide, N-methoxymethyl methacrylic acid amide, N-acetoxy-methyl methacrylic acid amide, acrylonitrile, hydroxyethylacrylate and/or hydroxyethylmethacrylate with styrene contents of 2-50 wt. % and containing 1-20 wt. % of polar monomers polymerized into the molecule), XNBR, XHNBR (fully hydrogenated NBR rubber in which up to 100% of the double bonds are hydrogenated), FKM (Fluoroelastomer), ACM (Poly acrylate rubber), EAM (copolymers of ethylene, methyl acrylate and a third carboxyl group-containing component currently sold under the tradename VAMAC® from DuPont). Preferably the present invention includes the use of XNBR and/or HXNBR.

As used throughout this specification, the term "nitrile rubber" or NBR is intended to have a broad meaning and is meant to encompass a copolymer having repeating units derived from at least one conjugated diene, at least one α,β-unsaturated nitrite and optionally one or more copolymerizable monomers.

Hydrogenated in this invention is preferably understood by more than 50% of the residual double bonds (RDB) present in the starting nitrile polymer/NBR being hydrogenated, preferably more than 90% of the RDB are hydrogenated, more preferably greater than 95% of the RDB are hydrogenated and most preferably more than 99% of the RDB are hydrogenated.

Suitable nitrite rubbers according to the present invention include low Mooney viscosity hydrogenated nitrile rubbers. Suitable rubbers have a Mooney viscosity of below 55 (ML 1+4 100C). Preferably the low Mooney viscosity polymers have a Mooney viscosity between 0-55. More preferably, the low Mooney viscosity polymers have a Mooney viscosity between 5-50, most preferably between 10-40. Even more preferably, the low Mooney viscosity polymers have a Mooney viscosity below 30 and even more preferably below 10. Suitable low Mooney viscosity polymers can be prepared by processes disclosed in U.S. Pat. Nos. 7,381,781, 6,841,623 and 6,780,939. The subject matter thereof being incorporated by reference.

The conjugated diene may be any known conjugated diene such as a $C_4$-$C_6$ conjugated diene. Preferred conjugated dienes include butadiene, isoprene, piperylene, 2,3-dimethyl butadiene and mixtures thereof. More preferred $C_4$-$C_6$ conjugated dienes are butadiene, isoprene and mixtures thereof. The most preferred $C_4$-$C_6$ conjugated diene is butadiene.

The α,β-unsaturated nitrile may be any known α,β-unsaturated nitrile, such as a $C_3$-$C_5$ α,β-unsaturated nitrile. Preferred $C_3$-$C_5$ α,β-unsaturated nitriles include acrylonitrile, methacrylonitrile, ethacrylonitrile and mixtures thereof. The most preferred $C_3$-$C_5$ α,β-unsaturated nitrile is acrylonitrile.

The inventive elastomer composition according to the present invention also includes the use of synergistic stabilizer system. Suitable systems include those disclosed in U.S. Pat. Nos. 6,946,526; 6,451,902; 7,005,467; U.S. Patent Publ. No. 2004/092634; U.S. Patent Publ. No. 2005/0143522; the subject matter thereof being incorporated herein by reference.

Preferred stabilizer systems include a salt of a strong base and a weak acid, the salt comprising a metal selected from Group I of the Periodic Table of Elements (according to IVPAC 1985) and an anion selected from the group consisting of carbonic acid, ethylene diamines tetra (acetic) acid, phosphoric acid and mixtures thereof.

The weak acids useful in the production of the above-mentioned salt are selected from the group consisting of carbonic acid, $C_1$-$C_{50}$ fatty acids, ethylene diamine tetra (acetic acid), phosphonic acid and mixtures thereof. The preferred salt for use in the present polymer composition may be selected from the group consisting of sodium carbonate, sodium acetate, sodium phosphate, sodium EDTA, a polycarbodiimide, a carbodiimide, potassium carbonate, sodium stearate, potassium stearate and mixrures thereof.

Another preferred stabilizer includes a metal salt of a secondary amine, wherein the metal is selected from groups 1 and 2 of the periodic system of the elements according to IUPAC 1985. Examples of suitable metals include lithium, sodium, potassium and calcium. Preferred are sodium and potassium. As one skilled in the art is well aware, combinations of two or more different metals are also suitable. Furthermore, mixtures of two or more metal secondary amine salts may be used to tailor the properties of the resulting vulcanizate. The secondary amine may be linear or branched and may have substituents. Examples of suitable substituents include $C_1$-$C_{40}$-alkyl groups, $C_1$-$C_{40}$-aryl groups, $C_1$-$C_{40}$-alkylaryl groups, and $C_1$-$C_{40}$-arylalkyl groups. The substituents may contain atoms other than carbon and hydrogen atoms, such as oxygen, sulfur, phosphorous, nitrogen, halogen, or silicon. Examples thereof include alkoxy, aryloxy, alkylthio, arylthio, alkylamines, arylamines, haloalkyl, haloaryl, and many more which will be obvious to one skilled in the art.

Non-limiting examples of preferred secondary amines include 4,4'-bis-α,α-dimethylbenzyl-diphenylamine (sold as NAUGARD® 445 by Uniroyal), Octylated diphenyl amine (ODPA) (sold as AGERITE STALITE® S by R.T. Vanderbilt) or styrenated diphenyl amine (sold as WINDSTAY 29 by Goodyear) or 2,4-bis-(n-octylthio)-6,4(4-hydroxy-3,5-di-t-butylanilino)-1,3,5-triazine (sold as IRGANOX® 565 by Ciba-Geigy) or butylated/octylated diphenylamine (sold as IRGANOX® 5057 by Ciba-Geigy).

The secondary amine may also be cyclic. Cyclic structures can be $C_3$-$C_{40}$ cycles and contain substituents, heteroatoms and/or aryl groups etc., such as 2,2,4-trimethyl-1,2-dihydroquinoline polymer (TMQ) (sold as VULKANOX® HS by Bayer).

The salts useful in this invention can be prepared according to standard procedures known in the art. Such as, by treating a THF solution of the diphenylamine compound with one equivalent of a metal hydride wherein the metal is selected from groups 1 and 2 of the periodic system of elements according to IUPAC 1985. Those skilled in the art will be aware of other methods.

A further preferred stabilizer system includes agents based on phenolic salts of sterically hindered phenolic compounds comprising at least two phenolic OH groups. Such agents disclosed in U.S. Patent Publ. No. 2004/0092634, the contents of which are incorporated by reference.

The inventive elastomeric composition according to the present invention contains in the range of about 1-20 phr, preferably 1-10 phr, more preferably 1-5 phr of the stabilizer system.

The inventive elastomeric composition according to the present invention further can contain at least one silane-modified mineral filler, preferably with a pH>7. Suitable mineral fillers include:

highly dispersed silicas, prepared e.g. by the precipitation of silicate solutions or the flame hydrolysis of silicon halides, with specific surface areas of in the range of from 5 to 1000 m2/g, and with primary particle sizes of in the range of from 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 m2/g and primary particle diameters in the range of from 10 to 400 nm;

natural silicates, such as kaolin and other naturally occurring silica;

glass fibers and glass fiber products (matting, extrudates) or glass microspheres;

Preferred fillers are acircular or nonisometric materials with an aspect ratio of 2:1 to 200:1 (including clays, talcs, micas). The aspect ratio of these platy materials is defined as the ratio of mean diameter of a circle of the same area as the face of the plate to the mean thickness of the plate. More preferable are needle-like structures with an aspect ratio of 2:1 to 20:1. The aspect ratio of the needle and fiber shaped fillers is the ratio of length to diameter.

The most preferred filler is a material belonging to the family of Wollastonites. Wollastonites are a naturally occurring calcium silicate mineral with the molecular formula $CaSiO_3$. They are white in color, acircular/needle-like, and have an alkaline pH. The Wollastonites used in the Examples of the present invention have aspect ratios of 3:1 to 5:1.

The silane used to modify the needle-like/acircular mineral filler preferably belongs to the family of difunctional or polyfunctional silanes having at least two functionalities: one compatible with the filler surface, such as alkoxy groups and a second functionality that compatibilizes the modified filler with the polymer matrix such as a vinyl group in the case of a peroxide-cured recipe.

The inventive elastomeric composition according to the present invention contains in the range of 1-200 phr, preferably 1-100 phr, more preferably 1-50 phr of the silane modified mineral filler.

The elastomer composition according to the present invention also includes acid acceptors such as metal oxides including magnesium oxide, calcium oxide, and carbonates with alkaline pH. The acid acceptor is added to the composition of the present invention in an amount in the range of 0-200 phr, more preferably 0-100 phr, and most preferably 0-50 phr. Preferably the acid acceptor is a divalent metal oxide.

Often, use of carbon black as an additional filler is advantageous. Usually, carbon black is present in the composition in an amount of in the range of from 20 to 200 phr, preferably 30 to 150 phr, more preferably 40 to 100 phr. Further, it might be advantageous to use a combination of carbon black and mineral filler in the inventive polymer composite. In this combination the ratio of mineral fillers to carbon black is usually in the range of from 0.05 to 20, preferably 0.1 to 10. The carbon blacks to be used here are prepared by the lamp black, furnace black or gas black process and have preferably BET (DIN 66 131) specific surface areas in the range of from 20 to 200 m2/g, e.g. SAF, ISAF, HAF, FEF or GPF carbon blacks.

The rubber elastomer according to the present invention can contain further auxiliary products for rubbers, such as reaction accelerators, vulcanizing accelerators, vulcanizing acceleration auxiliaries, antioxidants, foaming agents, antiaging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are, e.g., from 0.1 to 50 phr.

According to the present invention, the composition can contain in the range of 0.1 to 20 phr of an organic fatty acid as an auxiliary product, such as an unsaturated fatty acid having one, two or more carbon double bonds in the molecule which more preferably includes 10% by weight or more of a conjugated diene acid having at least one conjugated carbon-carbon double bond in its molecule. Those fatty acids can have in the range of from 8-22 carbon atoms, or for example from 12-18. Examples include stearic acid, palmitic acid and oleic acid and their calcium-, zinc-, magnesium-, potassium- and ammonium salts.

According to the present invention, the composition can contain in the range of 5 to 50 phr of an acrylate as an auxiliary product. Suitable acrylates are known from U.S. Pat. No. 5,391,627, from U.S. Pat. No. 5,208,294, see Col. 2, l. 25 to 40, and from U.S. Pat. No. 4,983,678, in particular Col. 2, l. 45 to 62. Reference is made to zinc acrylate, zinc diacrylate or zinc dimethacrylate or a liquid acrylate, such as trimethylolpropane-trimethacrylate (TRIM), butanedioldimethacrylate (BDMA) and ethylenglycoldimethacrylate (EDMA). It might be advantageous to use a combination of different acrylates and/or metal salts thereof. It may also be advantageous to use metal acrylates in combination with a Scorchretarder such as sterically hindered phenols (e.g. methyl-substituted aminoalkylphenols, such as 2,6-di-tert.-butyl-4-dimethylaminomethylphenol).

An antioxidant may be used in preparing a compound according to the present invention. Examples of suitable antioxidants include p-dicumyl diphenylamine (NAUGARD® 445), VULKANOX® DDA (a diphenylamine derivative), VULKANOX® ZMB2 (zinc salt of methylmercapto benzimidazole), VULKANOX® HS (polymerized 1,2-dihydro-2, 2,4-trimethyl quinoline) and IRGANOX® 1035 (thiodiethylene bis(3,5-di-tert.-butyl-4-hydroxy) hydrocinnamate or thiodiethylene bis(3-(3,5-di-tert.-butyl-4-hydroxyphenyl) propionate supplied by Ciba-Geigy. VULKANOX® is a trademark of Bayer AG.

Similarly, in preparing compounds according to the present invention, it is useful to employ a crosslinking agent, including commercially available agents including sulfur/sulfur accelerator systems, diamines and peroxides. Most preferred are the peroxide based vulcanizing agents due to the excellent thermal stability conveyed by the carbon-carbon linkages between polymer chains. Useful peroxide crosslinking agents, include dicumyl peroxide (Di-Cup 40KE), di-tert.-butyl peroxide, benzoyl peroxide, 2,2'-bis (tert.-butylperoxy diisopropylbenzene (VULCUP® 40KE), benzoyl peroxide, 2,5-dimethyl-2,5-di(tert-butylperoxy)-hexyne-3,2, 5-dimethyl-2,5-di(benzoylperoxy)hexane, (2,5-bis(tert.-butylperoxy)-2,5-dimethyl hexane and the like. Preferred curing agents are readily determined by means of a few preliminary experiments, which is within the scope of one skilled in the art. A preferred peroxide curing agent is commercially available under the tradename Di-Cup 40KE. The peroxide curing agent (60% active) is suitably used in an amount of 0.1 to 15 parts per hundred parts of rubber (phr), preferably 4 to 10 phr. Too much peroxide may lead to undesirably violent reaction.

Vulcanizing co-agents can also be added to the elastomeric composition of the present invention. Mention is made of triallyl isocyanurate (TAIC), commercially available under the trademark DIAK 7 from DuPont Or N,N'-m-phenylene dimaleimide know as HVA-2 (DuPont Dow), triallyl cyanurate (TAC) or liquid polybutadiene known as RICON D 153 (supplied by Ricon Resins). Amounts can be equivalent to the peroxide curative or less, preferably equal.

The present invention also includes the use of activators such as zinc peroxide (50% on an inert carrier) using STRUKTOL ZP 1014 in combination with the peroxide. Amounts can be from 0.1 to 15, preferably from 4 to 10 phr.

The ingredients of the elastomeric composition are often mixed together, suitably at an elevated temperature that may range from 25° C. to 200° C. Normally the mixing time does not exceed one hour and a time in the range from 2 to 30 minutes is usually adequate. Mixing is suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also:

Encyclopedia of Polymer Science and Engineering, Vol. 4, p. 66 et seq. (Compounding) and Vol. 17, p. 666 et seq. (Vulcanization).

The elastomeric composition according to the present invention is especially suitable for injection molding articles such as the present invention relates to shaped articles, such as seals, hoses, bearing pads, stators, well head seals, valve plates, cable sheathing, wheels, rollers, pipe seals and couplings.

EXAMPLES

Description of Tests:

Cure Rheometry:

Vulcanization testing was carried out on a Moving Die Rheometer (MDR 2000(E)) using a frequency of oscillation of 1.7 Hz and a 1° arc at 180° C. for 60 minutes total run time. The test procedure follows ASTM D-5289.

Compound Mooney Viscosity and Scorch:

A large rotor was used for these tests in compliance with the ASTM method D-1646. The compound Mooney viscosity was determined at 100° C. by preheating the sample 1 minute and then, measuring the torque (Mooney viscosity units) after 4 minutes of shearing action caused by the viscometer disk rotating at 2 r.p.m. Mooney scorch measurements taken at the time from the lowest torque value to a rise of 5 Mooney units (t05) were carried out at 125 and 135° C.

Stress-Strain:

Samples were prepared by curing a macro sheet at 180° C. for 13 minutes. Afterwards, samples were died out into standard ASTM die C dumbbells. The test was conducted at 23° C. and complies with ASTM D-412 Method A.

Hardness:

All hardness measurements were carried out with an A-2 type durometer following the procedure outlined in ASTM D-2240.

Tear Resistance:

A tensile sheet cured 14 minutes at 180° C. was used to prepare appropriate samples of Die B and Die C geometries. Both tests are designed to give an indication of the resistance to tear of the rubber. The test procedure complies with ASTM D 624.

Din Abrasion:

Abrasion resistance is determined according to test method DIN 53516. The volume loss by rubbing the rubber specimen with an emery paper of defined abrasive power is measured and reported.

Compression Set:

Performed in accordance with ASTM D395 (Method B). Solid button type samples were cured for 20 minutes at 180° C. and the sample subjected to a 10% compression deflection during hot air aging.

Preparations of Examples:

A laboratory size Banbury BR-82 (1.6 L capacity) internal mixer cooled at 30° C. was used to prepare the Examples. Rotor speed was held constant during mixing at 50 rpm. At 0 seconds, all 1A, (See Table 1) ingredients were added. At 60 seconds, the 1B ingredients were added to the mixer. A sweep was performed at 200 seconds and finally the mix was dumped at 360 seconds. The dropped mix was allowed to cool for four hours prior to addition of curatives. The curatives (2A ingredients) were both added on a 10" by 20" two roll mill cooled at 30° C.

TABLE 1

Formulations.

| FORMULATIONS | | Comp. 1 | Ex. 1 | Ex. 2 |
|---|---|---|---|---|
| THERBAN ® A 3907 | 1A | 92 | 92 | 92 |
| THERBAN ® HT VP KA 8805 | 1A | 15 | 15 | 15 |
| 400 WOLLASTOCOAT 10022 | 1B | — | — | 30 |
| CARBON BLACK, N 660 STERLING-V | 1B | 50 | — | — |
| MAGLITE ® D | 1B | — | 20 | 20 |
| PLASTHALL ® TOTM | 1B | 5 | 5 | 5 |
| SILANE ® A-172 DLC (72%) | 1B | — | 3 | — |
| ZEOLEX ® 23 | 1B | — | 30 | — |
| KADOX ® 920 | 1B | 3 | 3 | 3 |
| DIAK ® #7 | 2A | 1.5 | 1.5 | 1.5 |
| VULCUP ® 40KE | 2A | 7.5 | 7.5 | 7.5 |
| Specific Gravity | | 1.171 | 1.236 | 1.271 |

THERBAN ® A3907 from Lanxess Deutschland GmbH 39% ACN, 70 ML(1 + 4) @ 100 C., 0.9% max RDB
THERBAN ® HT VP KA 8805 from Lanxess Deutschland GmbH 34% ACN, 45 ML(1 + 4) @ 100 C., 0.9% max RDB
NAUGARD ® 445 is a diphenylamine NO available from Crompton
VULKANOX ® ZMB-2 is a A/O available from Lanxess Deutschland GmbH
Carbon Black N 660 available from Cabot Tire Blacks
ZEOLEX ® 23 is a silica from Huber
400 Wollastocoat 10022 is a silane-modified wollastonite from Nyco
MAGLITE ® D is Magnesium oxide from C.P. Hall
PLASTHALL ® TOTM (Trioctyl Trimellitate) is a plasticizer from C.P. Hall.
KADOX ® 920 is a Zinc Oxide from ZCA (Zinc Corporation of America)
DIAK ® 7 (Triallyl isocyanurate) is a coagent from DuPont
VULCUP ® 40 KE (αβ-bis(t-butylperoxy)diisopropylbenzene), 40% peroxide

TABLE 2

Properties and aging.

| | Comp. 1 | Ex. 1 | Ex. 2 |
|---|---|---|---|
| MDR CURE CHARACTERISTICS 1.7 Hz, 180 C., 1 arc, 60 in, 100 torque range | | | |
| MH (dN.m) | 47.39 | 52.53 | 41.25 |
| ML (dN.m) | 2.23 | 3.02 | 2.01 |
| Delta MH-ML (dN.m) | 45.16 | 49.51 | 39.24 |
| ts 1 (min) | 0.36 | 0.36 | 0.42 |
| ts 2 (min) | 0.42 | 0.42 | 0.48 |
| t' 90 (min) | 5.2 | 4.53 | 4.75 |
| t' 95 (min) | 6.59 | 5.73 | 5.99 |
| COMPOUND MOONEY SCORCH MS, LR, 135 C. | | | |
| t Value t05 (min) | 12.86 | 20.98 | 18.76 |
| t Value t35 (min) | >30 | >30 | >30 |
| COMPOUND MOONEY VISCOSITY | | | |
| ML (1 + 4) @ 100° C. | 79 | 86 | 70 |
| COMPRESSION SET-METHOD B 150° C. | | | |
| 168 hrs | 26 | 37 | 28 |
| 1008 hrs | 38 | 51 | 37 |
| 2016 hrs | 46 | 54 | 41 |
| 160° C. | | | |
| 1008 hrs | 44 | 52 | 39 |
| 175° C. | | | |
| 336 hrs | 40 | 54 | 36 |
| STRESS STRAIN (DUMBELLS) | | | |
| Hardness Shore A2 (pts.) | 66 | 66 | 60 |
| Ultimate Tensile (MPa) | 21.92 | 14.56 | 12.85 |
| Ultimate Elongation (%) | 231 | 263 | 315 |
| Stress @ 25 (MPa) | 1.9 | 1.76 | 1.51 |
| Stress @ 50 (MPa) | 3.32 | 2.6 | 2.21 |
| Stress @ 100 (MPa) | 8.49 | 5.09 | 3.86 |
| Stress @ 200 (MPa) | 19.76 | 10.63 | 6.97 |
| Stress @ 300 (MPa) | | | 11.64 |

TABLE 2-continued

Properties and aging.

|  | Comp. 1 | Ex. 1 | Ex. 2 |
|---|---|---|---|
| STRESS STRAIN (HOT AIR OVEN) | | | |
| 168 hrs/150° C. | | | |
| Chg. Hard. Shore A2 (pts.) | 10 | 8 | 6 |
| Chg. Ulti. Tens. (%) | −8 | 19 | 10 |
| Chg. Ulti. Elong. (%) | 0 | −34 | −14 |
| 1008 hrs/150° C. | | | |
| Chg. Hard. Shore A2 (pts.) | 13 | 10 | 9 |
| Chg. Ulti. Tens. (%) | −34 | 3 | −8 |
| Chg. Ulti. Elong. (%) | −30 | −46 | −9 |
| 168 hrs/160° C. | | | |
| Chg. Hard. Shore A2 (pts.) | 11 | 7 | 7 |
| Chg. Ulti. Tens. (%) | −16 | 8 | 16 |
| Chg. Ulti. Elong. (%) | −4 | −42 | −10 |
| 1008 hrs/160° C. | | | |
| Chg. Hard. Shore A2 (pts.) | 16 | 13 | 12 |
| Chg. Ulti. Tens. (%) | −31 | −17 | −17 |
| Chg. Ulti. Elong. (%) | −58 | −63 | −34 |
| 168 hrs/170° C. | | | |
| Chg. Hard. Shore A2 (pts.) | 13 | 7 | 9 |
| Chg. Ulti. Tens. (%) | −24 | 12 | 17 |
| Chg. Ulti. Elong. (%) | −24 | −40 | 4 |
| 168 hrs/180° C. | | | |
| Chg. Hard. Shore A2 (pts.) | 13 | 10 | 10 |
| Chg. Ulti. Tens. (%) | −17 | 2 | −5 |
| Chg. Ulti. Elong. (%) | −37 | −45 | −7 |

Results & Discussion

Inventive Example 2 has a faster cure (shorter t90) and good cure characteristics although its MH is lower than Inventive Example 1 and Comparative Example 1. It also has improved processability with a lower compound Mooney. This can be attributed to the silane modification of the Wollastonite at a microscopic scale which results in better dispersion/incorporation in the rubber matrix compared to Inventive Example 1 where the mineral filler (ZEOLEX® 23) and silane compatibilizer are added separately. It also shows a lower compression set after long term air aging @ 150° C. (2016 hrs) as well as at higher temperatures. The long-term air aging data at 150° C. and aging at 160° C., 170° C., and 180° C. clearly shows that Inventive Example 2 has superior heat resistance compared to Example 1 which has a basic mineral additive known to improve aging.

The combination of a heat stabilizer package (THERBAN® HT 8805) and a silane-modified platy basic (pH=9.9) mineral additive results in a synergy leading to Inventive Example 2 that has superior heat resistance, lower compression set, and lower compound Mooney. This inventive compound is superior to comparative Example 1 containing the stabilizer package only as well as to Inventive Example 1 containing the stabilizer and a basic mineral additive known in the art to improve aging.

TABLE 3

Formulations and Properties

|  |  | Comp. 2 | Ex. 3 |
|---|---|---|---|
| FORMULATION | | | |
| THERBAN ® A 3907 | 1A | 100 | 100 |
| NAUGARD ® 445 | 1B | 1.1 | 1.1 |
| VULKANOX ® ZMB-2/C5 (ZMMBI) | 1B | 0.4 | 0.4 |
| ZEOLEX ® 23 | 1B | 30 | |
| 400 WOLLASTOCOAT 10022 | 1B | | 30 |
| SILANE ® A-172 DLC (72%) | 1B | 3 | |
| MAGLITE ® D | 1B | 20 | 20 |
| PLASTHALL ® TOTM | 1B | 5 | 5 |
| ZINC OXIDE (KADOX 920) | 1B | 3 | 3 |
| DIAK ® #7 | 2A | 1.5 | 1.5 |
| VULCUP ® 40KE | 2A | 7.5 | 7.5 |
| MDR CURE CHARACTERISTICS | | | |
| 1.7 Hz, 180° C., 1 arc, 100 torque range | | | |
| MH (dN.m) | | 51.9 | 39.79 |
| ML (dN.m) | | 2.83 | 1.91 |
| Delta MH-ML (dN.m) | | 49.07 | 37.88 |
| ts 1 (min) | | 0.36 | 0.42 |
| t' 90 (min) | | 4.43 | 4.53 |
| t' 95 (min) | | 5.58 | 5.71 |
| COMPOUND MOONEY SCORCH | | | |
| MS, Large, 135° C. | | | |
| t Value t05 (min) | | 18.3 | 18.03 |
| t Value t35 (min) | | >30 | >30 |
| COMPOUND MOONEY VISCOSITY | | | |
| Mooney Viscosity (MU) | | 87 | 68 |
| COMPRESSION SET-METHOD B | | | |
| 168 hrs/150° C. | | 29 | 28 |
| 3024 hrs/150° C. | | 55 | 48 |
| STRESS STRAIN (DUMBELLS) | | | |
| 23° C. | | | |
| Hardness Shore A2 (pts.) | | 64 | 62 |
| Ultimate Tensile (MPa) | | 16.32 | 9.95 |
| Ultimate Elongation (%) | | 296 | 269 |
| Stress @ 25 (MPa) | | 1.67 | 1.19 |
| Stress @ 50 (MPa) | | 2.56 | 1.87 |
| Stress @ 100 (MPa) | | 5.21 | 3.63 |
| Stress @ 200 (MPa) | | 11.02 | 7.4 |
| Stress @ 300 (MPa) | | | |
| STRESS STRAIN (HOT AIR OVEN) | | | |
| 168 hrs/150° C. | | | |
| Chg. Hard. Shore A2 (pts.) | | 9 | 5 |
| Chg. Ulti. Tens. (%) | | 13 | 51 |
| Chg. Ulti. Elong. (%) | | −43 | −4 |
| 1008 hrs/150° C. | | | |
| Chg. Hard. Shore A2 (pts.) | | 11 | 10 |
| Chg. Ulti. Tens. (%) | | 3 | 71 |
| Chg. Ulti. Elong. (%) | | −55 | −16 |
| 3024 hrs/150° C. | | | |
| Chg. Hard. Shore A2 (pts.) | | 30 | 11 |
| Chg. Ulti. Tens. (%) | | −41 | 45 |
| Chg. Ulti. Elong. (%) | | −97 | −72 |
| 168 hrs/160° C. | | | |
| Chg. Hard. Shore A2 (pts.) | | 10 | 5 |
| Chg. Ulti. Tens. (%) | | 9 | 40 |
| Chg. Ulti. Elong. (%) | | −48 | −4 |
| 168 hrs/170° C. | | | |
| Chg. Hard. Shore A2 (pts.) | | 7 | 7 |
| Chg. Ulti. Tens. (%) | | 7 | 43 |
| Chg. Ulti. Elong. (%) | | −50 | −11 |
| 168 hrs/180° C. | | | |
| Chg. Hard. Shore A2 (pts.) | | 11 | 7 |
| Chg. Ulti. Tens. (%) | | 2 | 45 |
| Chg. Ulti. Elong. (%) | | −55 | −2 |
| STRESS STRAIN (MACRO, LIQUID IMM.) | | | |
| 336 hrs/80° C., Water | | | |
| Chg. Hard. Shore A2 (pts.) | | 5 | 2 |
| Chg. Ulti. Tens. (%) | | −6 | 1 |

TABLE 3-continued

Formulations and Properties

|  | Comp. 2 | Ex. 3 |
|---|---|---|
| Chg. Ulti. Elong. (%) | 8 | 11 |
| Vol. Change (%) | 29.6 | 4.2 |

Inventive Example 3 containing (Wollastocoat) has a lower compound Mooney of 68 compared to Comparative Example 2 containing ZEOLEX® 23. It also shows a lower compression set after long term air aging @150° C. (3024 hrs). The long-term air aging data at 150° C. and aging at higher test temperatures, as evidenced by the better retention in elongation, clearly shows that Inventive Example 3 has superior heat resistance compared to Comparative Example 2 which has a basic mineral additive known to improve aging. This data confirms the special effect of the Wollastocoat filler in improving heat resistance of HNBR even in the absence of the heat stabilizer package THERBAN® HT VP KA 8805. Inventive Example 3 also has superior swelling (lower swelling) in water.

The invention claimed is:

1. An elastomeric composition comprising:
   a. hydrogenated nitrile rubber derived from at least one conjugated diene, at least one alpha, beta-unsaturated nitrile and optionally one or more copolymerizable monomers,
   b. a silane modified wollastonite,
   c. a divalent metal oxide acid acceptor,
   d. a stabilizer system comprised of a hydrogenated nitrile rubber and a stabilizer which is selected from the group consisting of a salt of a strong base and a weak acid, a metal salt of a secondary amine or a phenolic salt of a sterically hindered phenolic compound comprising at least two phenolic OH groups, and
   f. optionally further additives.

2. The elastomeric composition according to claim 1, wherein component a is a hydrogenated carboxylated nitrile rubber.

3. The composition according to claim 1, wherein the acid acceptor is an alkaline additive selected from the group consisting of metal oxides and carbonates.

4. The rubber composition according to claim 1, wherein the stabilizer system is incorporated in an amount between 5-30 phr.

5. The rubber composition according to claim 1, wherein the stabilizer system is incorporated in an amount between 5-20 phr.

6. The composition according to claim 1, wherein the silane-modified wollastonite is incorporated in an amount between 0.1 to 200 phr.

7. The composition according to claim 6, wherein the silane-modified wollastonite is incorporated in an amount between 5 to 100 phr.

8. The composition according to claim 7, wherein the silane-modified wollastonite is incorporated in an amount between 10 to 80 phr.

9. The composition according to claim 1, wherein the acid acceptor is incorporated in an amount between up to 200 phr.

10. The composition according to claim 9, wherein the acid acceptor is incorporated in an amount between up to 100 phr.

11. The composition according to claim 10, wherein the acid acceptor is incorporated in an amount between up to 50 phr.

12. The rubber composition according to claim 1, further comprising a curative.

13. The rubber composition according to claim 1, further comprising at least one black filler.

14. The rubber composition according to claim 1, further comprising antioxidants, anti-aging agents, heat stabilizers, processing aids, plasticizers, foaming agents, reaction accelerators and/or activators, or vulcanizing accelerators.

15. A process for improving the long-term aging, heat resistance, compression set, and processability of an elastomer composition comprising adding a stabilizer system, an acid acceptor, and a silane-modified wollastonite to the composition.

16. A shaped article comprising an elastomeric composition according to claim 1.

* * * * *